UNITED STATES PATENT OFFICE.

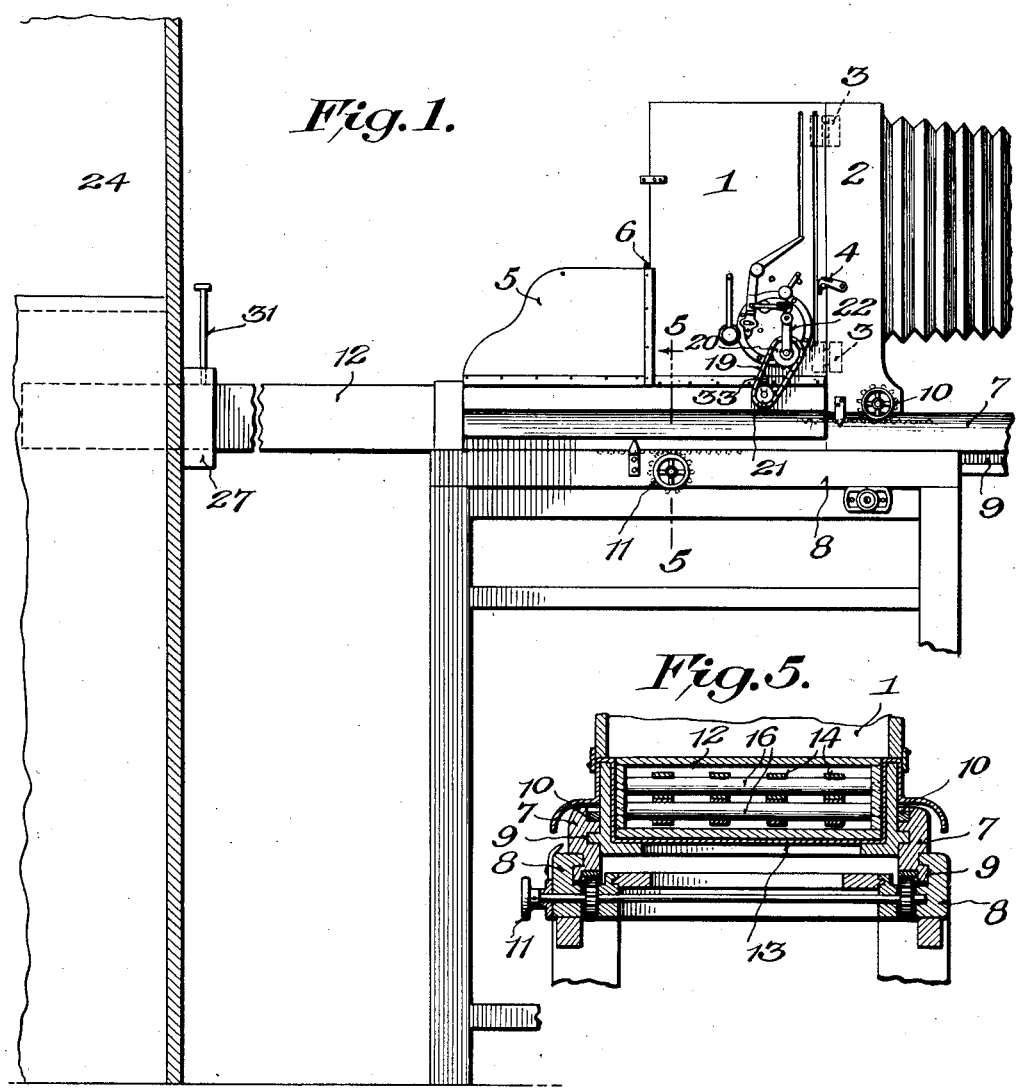

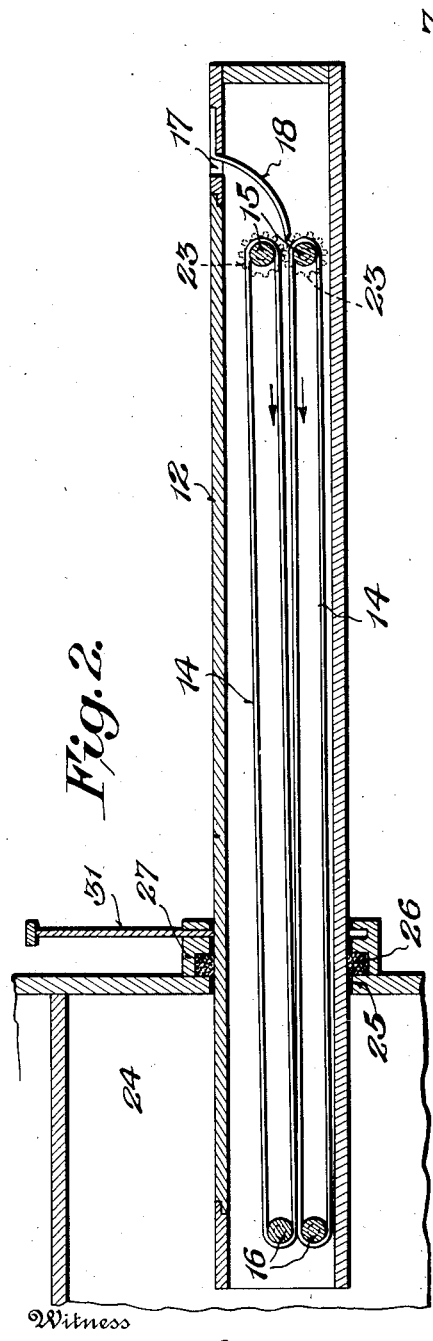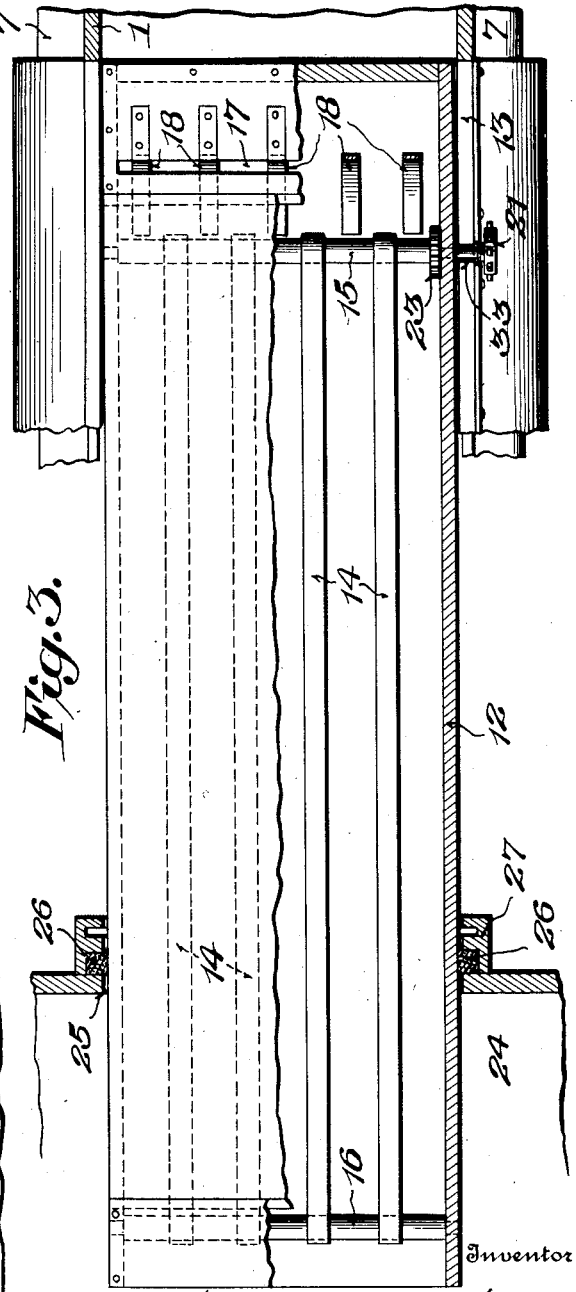

HENRY T. D'ALBERT, OF ARLINGTON, VIRGINIA, ASSIGNOR TO GRANT LEET, OF WASHINGTON, DISTRICT OF COLUMBIA.

PHOTOGRAPHIC EXPOSURE APPARATUS AND CONVEYING-CONDUIT THEREFOR.

1,358,623.   Specification of Letters Patent.   Patented Nov. 9, 1920.

Application filed August 15, 1918. Serial No. 250,061.

*To all whom it may concern:*

Be it known that I, HENRY T. D'ALBERT, a citizen of the United States, residing at Arlington, in the county of Alexandria and State of Virginia, have invented certain new and useful Improvements in Photographic Exposure Apparatus and Conveying-Conduits Therefor, of which the following is a specification.

My invention relates to carrying conduits for photographic instruments, and has for its object the conveying of exposed photographic paper or films to a suitable light-tight place, such as a dark-room or some independent receptacle where it may receive further treatment, or to a dark box where it may be safely stored awaiting treatment.

The invention consists, broadly speaking, of a photographic camera and a dark receptacle with which the camera has movable light-tight connection, whereby the photographic paper or films are discharged directly from the camera into the dark receptacle without the necessity of their being taken out and handled, and regardless of the adjustment or position of the camera.

The invention further comprises a light-tight conduit, of any suitable shape or form, carried by and detachably connected with the camera and adapted to receive at one end exposed photographic paper or films and to deliver the same at the other end into a light-tight receptacle or place, with which the conduit is movably connected.

The conduit is secured to the camera and to the receptacle at the delivery end in such a manner as to permit entire freedom in focusing the camera either by the focusing-scale with which the camera is provided, or by the ground glass.

In the accompanying drawings:—

Figure 1 is a view in side elevation showing the camera, dark-receptacle and the conduit carried by the camera and slidably connected with the dark receptacle;

Fig. 2 is an enlarged longitudinal vertical section through the conduit showing the carrier tapes therein, and through a fragmentary portion of the dark receptacle;

Fig. 3 is a top plan view of the same with parts broken away and partly in section;

Fig. 4 is a fragmentary view showing a flexible light-tight connection between conduit and dark receptacle;

Fig. 5 is a transverse section on line 5—5 of Fig. 1 with parts broken away.

The magazine of the photographic instrument comprises two sections 1 and 2, connected on one side by hinges 3, and on the other by a hook 4, and a cover 5 is connected to section 1 by a horizontally-disposed hinge 6, which construction admits of the section 1 being swung aside by first lifting the cover 5 on its hinge and the hook 4 on its pivot, and then swinging section 1 on its hinges 3.

Section 2 of the magazine is slidably connected with the camera-bed 7, which latter is slidably mounted upon the camera-support or table 8, as shown by the ribbed connections 9 as illustrated in Fig. 5.

The magazine and the camera bed are slidable and detachable independently of each other, the magazine to get the right focus and the camera-bed to adjust the lens with respect to the center of the field to be photographed. These adjustments are made independently by the racks and pinions 10 and 11, as shown in Figs. 1 and 5.

The numeral 12 represents my improved carrier, conduit or tube. This is detachably connected with the camera and is adapted to occupy the space provided for the usual developing-pan in the removable sheet-metal tray 13, as shown in Fig. 5.

The conduit 12 may be made in any approved manner, but preferably is in the nature of a tube rectangular in cross-section, and provided in the interior with carrier-tapes 14 which pass around the drive-shafts 15 and the idle-shafts 16 at opposite ends of the conveyer, the films or prints being received from the magazine through an inlet 17 and guided between these tapes 14 by the curved fingers 18, of which there are several as shown in Fig. 3.

These carrier-tapes may be operated through a sprocket-chain 19 passed around the sprocket-wheels 20 and 21, as shown in Fig. 1, the latter on the outer end of one of the shafts 15, so that, as the operator turns the crank 22 to feed the paper down from the magazine, he simultaneously sets in motion the carrier tapes 14, which move together in the direction of the arrows in Figs. 2 and 3, due to the intermeshing gears 23 on the shafts 15.

When the exposed paper or film is left uncut, it could obviously be carried directly through the conduit without the employment of any special conveyer mechanism, such as the tapes.

The conduit 12 is shown in the drawings extending slidably into the dark box or room 24, through an opening 25, which is suitably constructed to exclude the light, yet, at the same time, to permit the conduit 12 to be freely moved in or out as may be necessary in focusing the camera, or to be entirely removed, which is, of course, necessary when the conduit is lifted out of the machine.

Two different means are illustrated for insuring a light-tight connection between the conduit and the dark box or room, for instance in Figs. 2 and 3, a packing-ring 26 of some soft texture is inserted in a groove in the box 27 which surrounds the conduit. By the frictional contact of this packing 26 with the conduit it makes a light-tight joint.

In Fig. 4 the same thing is accomplished by the bellows 28 made of flexible material secured to the wall of the box or room 24 at one end, and removably secured to the conduit by the collar 29 and set screws 30 at the other end.

Obviously other methods of forming a light-proof joint might be employed.

Any suitable receptacle may be placed in the dark room to receive the cut paper or films as it passes from the conduit.

A sliding door 31 may also be employed to close the opening 25 when the conduit is withdrawn for removal from the machine.

By reason of this sliding connection of the conduit with the dark room or dark box, the operator is free to give his entire attention to the camera, and by the use of this conduit he is enabled to obtain the maximum number of prints from the camera being controlled by the time of the exposure, which is usually about three seconds, and not by the time required to develop them, which is about thirty seconds. In other words, the prints require no attention, they being automatically disposed of as fast as they are made and cut or otherwise removed from the photographic instrument, thus admitting of a continuous operation as distinguished from the usual interrupted or intermittent action necessitated by methods heretofore employed.

While in the ordinary focusing, the conduit 12 remains attached as a part of the photographic instrument, and moves with it both in the focusing and in the shifting of the machine as a whole to bring the lens opposite the center of the field or the subject to be photographed, and does not leave the dark room or box, if it should be desired to remove the conduit from the machine, this can be done by first moving the camera forward on its bed until the rear end of the conduit is withdrawn from the opening 25 into the dark room or box, then lifting the cover 5 on its hinge, then unhooking the section 1 of the magazine, removing the sprocket-chain 19 from the wheel 21 and swinging the section 1 to one side out of the vertical plane of the conduit 12. Then the conduit can be lifted out of the tray 13 and from the machine, the slot 33 above the axle of the upper shaft 15 being provided to allow the shaft to be removed. Then the instrument is ready for the reinsertion of the pan, if it is desired to use the instrument without the conduit. In other words the conduit 12 is removable both from the photographic instrument and from the dark room or box. When in operation, it has always a movable or sliding connection with the dark room or box, so that the prints are conveyed into the latter regardless of the position of the camera in any of the various changes made in focusing, and the conduit is so adjusted to the camera as to permit use on subjects covering a larger field than provided on the copy board of the camera. It is understood that this may be accomplished by sliding the entire camera-bed forward through the rack and pinion 11 until the center of the lens is in the center of the field to be photographed, and all the while the light-tight connection is being maintained between the light-tight receptacle and the camera.

I claim:

1. A device of the class described for transferring exposed sensitized photographic media from an exposure apparatus to an actinic light-ray-excluding receptacle, comprising an actinic light-ray-excluding conduit, means associated therewith adapting the conduit to be slidably extended at its discharge end into the receptacle to the exclusion of actinic light rays, and means operating within the conduit for conducting the media therethrough.

2. A device of the class described for transferring exposed sensitized photographic media from an exposure apparatus to an actinic light-ray-excluding receptacle, comprising an actinic light-ray-excluding conduit, means associated therewith adapting the conduit to be connected with the receptacle to the exclusion of actinic light rays and for adjustment in the general direction of its length with relation to the receptacle, and means operating within the conduit for conducting the media therethrough.

3. A device of the class described for transferring exposed sensitized photographic media from an exposure apparatus, comprising an actinic light-ray-excluding conduit, an actinic light-ray-excluding receptacle having an opening through which the discharge end of the conduit is slidably adjustably received, and means associated with the receptacle for preventing the passage of actinic light rays past the conduit and through the said opening.

4. The combination with an exposure apparatus capable of focusing adjustment, of a receptacle closed to actinic light rays, and a conduit also closed to actinic light rays for conducting exposed sensitized media from the exposure apparatus to the receptacle and adjustable with relation to the receptacle in the direction of focusing adjustment of the said exposure apparatus.

5. The combination with an exposure apparatus capable of focusing adjustment, of an actinic light-ray-excluding receptacle, an actinic light-ray-excluding conduit for conducting exposed photographic media from the apparatus to the receptacle, and means providing light-excluding connection between the conduit and the receptacle whereby the conduit may be bodily moved with the apparatus in effecting the focusing adjustment of the latter without interfering with the delivery of the exposed media to the said receptacle.

6. The combination with an exposure apparatus capable of focusing adjustment, of an actinic light-ray-excluding receptacle, and an actinic light-ray-excluding conduit adjustable with the apparatus and adjustable with relation to the receptacle in the direction of focusing adjustment of the said apparatus while maintaining delivery relation to the receptacle.

7. The combination with an exposure apparatus capable of focusing adjustment, of an actinic light-ray-excluding receptacle, an actinic light-ray-excluding conduit for conducting exposed photographic media from the said apparatus to the receptacle and adjustable with the apparatus and with relation to the receptacle, and conducting means operating within the conduit.

8. The combination with an exposure apparatus capable of focusing adjustment, of a receptacle closed to actinic light rays, and a conduit also closed to actinic light rays leading from the apparatus and extending into the receptacle, the conduit being adjustable with the apparatus in its focusing adjustment and adjustable with relation to the receptacle.

9. The combination with an exposure apparatus capable of focusing adjustment, of a receptacle closed to actinic light rays, and an actinic light-ray-excluding conduit for conducting exposed media from the apparatus to the receptacle, the said conduit being detachably connected with the apparatus and connected with the receptacle for adjustment in the focusing of the exposure apparatus.

10. The combination with an exposure apparatus capable of focusing adjustment, of an actinic light-ray-excluding receptacle having an opening in its wall, an actinic light-ray-excluding conduit connected with the apparatus for conducting exposed media therefrom, the said conduit fitting slidably adjustably through the said opening, and means surrounding the opening and extending about the conduit for excluding light rays.

11. A device for transferring exposed sensitized media from an exposure apparatus to a receptacle, comprising a conduit arranged at one end for connection with the exposure apparatus and to receive the exposed media, means for connecting the other end of the conduit with the receptacle to the exclusion of actinic light rays, and means for conducting the media through the conduit.

In testimony whereof I affix my signature.

HENRY T. D'ALBERT.